United States Patent [19] [11] 3,994,127
Gower [45] Nov. 30, 1976

[54] CONNECTOR DEVICE
[76] Inventor: Roger L. Gower, 21 Coburn Ave., Skowhegan, Maine 04976
[22] Filed: Mar. 3, 1975
[21] Appl. No.: 554,828

Related U.S. Application Data
[63] Continuation-in-part of Ser. No. 467,895, May 8, 1974, abandoned.

[52] U.S. Cl. ................................................. 59/85
[51] Int. Cl.² ......................................... F16G 15/04
[58] Field of Search ........................... 59/85, 86, 93; 24/230.5 CR; 294/82 R, 78, 74; 403/154, 155, 157, 158

[56] References Cited
UNITED STATES PATENTS

| 547,642 | 10/1895 | King | 59/86 |
| 1,513,729 | 11/1924 | Adams | 59/85 |
| 2,353,940 | 7/1944 | Staats | 59/85 |
| 2,369,344 | 2/1945 | Ehmann | 59/86 |
| 2,396,084 | 3/1946 | Clark | 403/155 |
| 3,453,822 | 7/1969 | Crook | 59/85 |

FOREIGN PATENTS OR APPLICATIONS

| 10,439 | 1/1956 | Germany | 403/155 |
| 853,538 | 10/1952 | Germany | 59/85 |
| 311,049 | 5/1929 | United Kingdom | 59/86 |
| 614,350 | 12/1948 | United Kingdom | 59/85 |
| 1,034,979 | 7/1966 | United Kingdom | 59/85 |

Primary Examiner—C.W. Lanham
Assistant Examiner—Gene P. Crosby
Attorney, Agent, or Firm—Pollock, Vande Sande & Priddy

[57] ABSTRACT

An improvement is disclosed in connector devices such as those comprising connector links for use with chain and cable. Two mating end pieces are provided such as chain half-links, each having a transverse bore therein to receive a connecting pin. The connecting pin has a diameter slightly less than that of the bore in the end pieces so that the end pieces are freely rotatable about the pin and relative to each other. Each end of the pin is chamfered and a split-ring collar is provided for each end of the pin so that once the pin is inserted through the aligned bores in the end pieces, the split-ring collars can be driven onto the respectively opposite ends of the pin to hold the pin in place.

5 Claims, 4 Drawing Figures

CONNECTOR DEVICE

This application is a continuation-in-part of my prior copending U.S. application Ser. No. 467,895, filed May 8, 1974, and now abandoned.

BACKGROUND OF THE INVENTION

The invention provides a connector device having the configuration of a chain link, for use with chain and cable. In a preferred embodiment, two identical half-link parts are provided, and these, together with a connecting pin and a pair of split-ring collars, comprise the entire connector device. The concept of the invention is not, however, limited to a connector device comprising two half-links, but is equally applicable, for example, to a grab hook or to a slip hook wherein such hook defines and end portion having a clevis-type configuration, permitting such end portion to be detachably connected to a chain link or to a loop in the end of a cable, with the clevis-type end portion then being closed by a pin secured in place by split-ring collars as disclosed herein.

Numerous types of connector links for use with chain and cable have been provided in the prior art. Generally, however, these prior art connector links have the disadvantage that they comprise a number of small fittings so that it is readily possible to loose one of the parts so as to render the entire connector device useless in the field. Where chain is used in cold climates, or on jobs where men's hands are accustomed to heavy work and are somewhat lacking in dexterity, it may at times be difficult to assemble a connector device comprising a number of small parts which must be carefully fitted relative to each other. It is accordingly an object of this invention to provide a connector device which requires only a very small number of parts and which can readily be assembled in the field even under conditions of snow and cold which would ordinarily tend to make assembly difficult.

It is a further object of the invention to provide a connector device comprising a pair of identical members which can be matedly assembled in a manner to provide a smooth outer surface without protuberances which could otherwise become entangled in underbrush, be caught on rocks, tree limbs, etc.

SUMMARY OF THE INVENTION

According to a preferred embodiment of the invention, there is provided a pair of identical end pieces, or half-links, each defining an arc of substantially 180° and each having at one end a single leg and at the other end a pair of parallel legs. A transverse bore extends through each leg in such manner as to create a continous passage in the plane of the link thus formed to accommodate a pin which is retained in such through passage.

One of the features of the invention comprises the enlargement of the inner leg of the pair of parallel legs of each half-link so that the enlarged portion extends approximately to the center of the link. This structure adds strength to the connector, giving it the semblance of stud link chain wherein a transverse stud, or brace, is inserted in each link to keep the sides from collapsing under strain. The abutting enlarged inner legs of the present invention achieve the same bracing action of a stud, making this connector substantially stronger than such connectors heretofor available.

The connector device of the invention is assembled by mating the parallel legs of one half-link with the single leg of the other half-link and inserting the pin through the aligned bores provided in each of said legs. The pin which passes through the aligned bores may be a solid pin and is preferably chamfered at each end to facilitate driving onto each end of the pin a split-ring collar whose diameter is normally less than the diameter of the pin, but with the pin of course being capable of being opened to a somewhat larger diameter as it is driven onto the end of the pin. Preferably, the diameter of the pin itself is somewhat less than the inner diameter of the through bore in the half-links so that each half-link can freely rotate about the pin, thereby ensuring that the two half-links are freely rotatable relative to each other.

BRIEF DESCRIPTION OF THE DRAWINGS

In describing the invention, reference will be made to the accompanying drawings in which.

DETAILED DESCRIPTION OF THE PREFERRED EMBODIMENT

Figure 1:
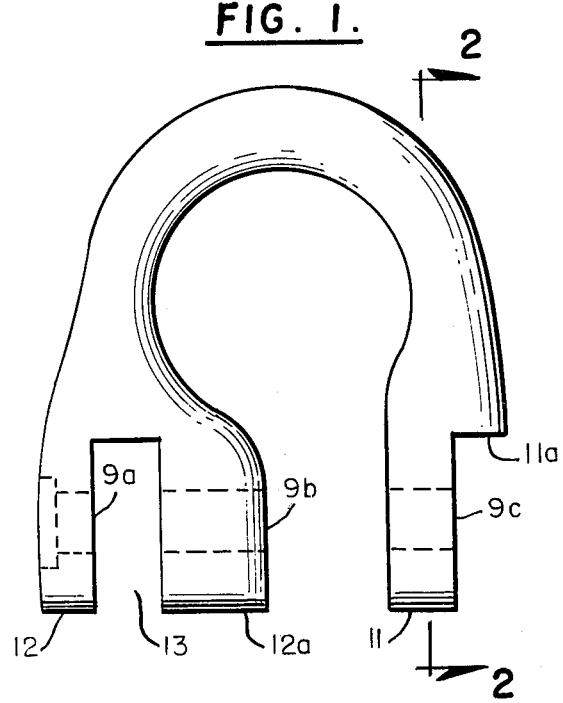
FIG. 1 is a top plan view of a half-link comprising an element of the present invention
Figure 2:
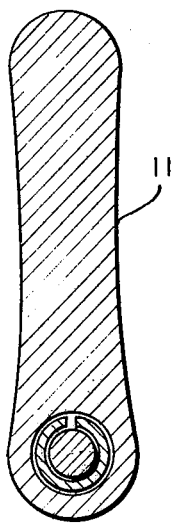
FIG. 2 is a cross-section taken along the line 2—2 of FIG. 1.
Figure 3:
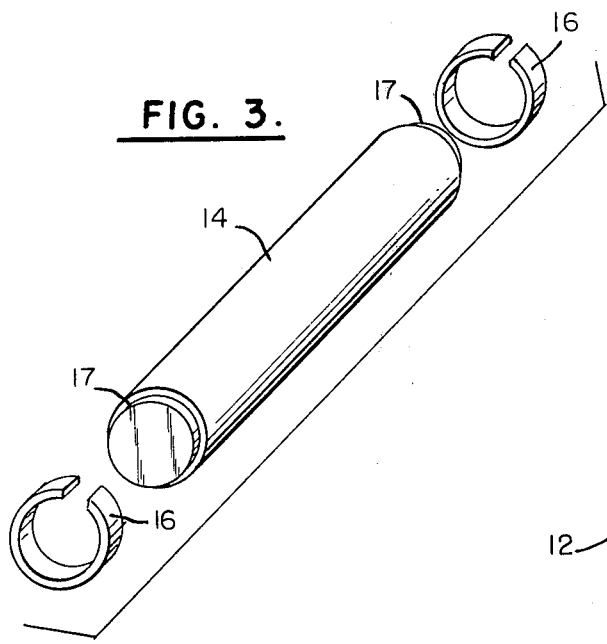
FIG. 3 is a perspective view of the connecting pin and also of the split rings which are assembled onto the opposite ends of the pin.

In FIG. 1, half-link 10 is shown as having a single leg 11 and parallel legs 12 and 12a, the inner leg 12a being enlarged to extend to a point substantially midway between the outermost borders of said half-link. Channel 13 between the parallel legs 12 and 12a of one half-link accommodates leg 11 of the other half-link when the two are assembled. FIG. 1 shows that leg 11 is set inwardly at 11a by an amount substantially equalling the thickness of leg 12. Therefore, when the two members 10 are assembled as shown in FIG. 4, a smooth external surface without protuberances is provided.

Figure 4:
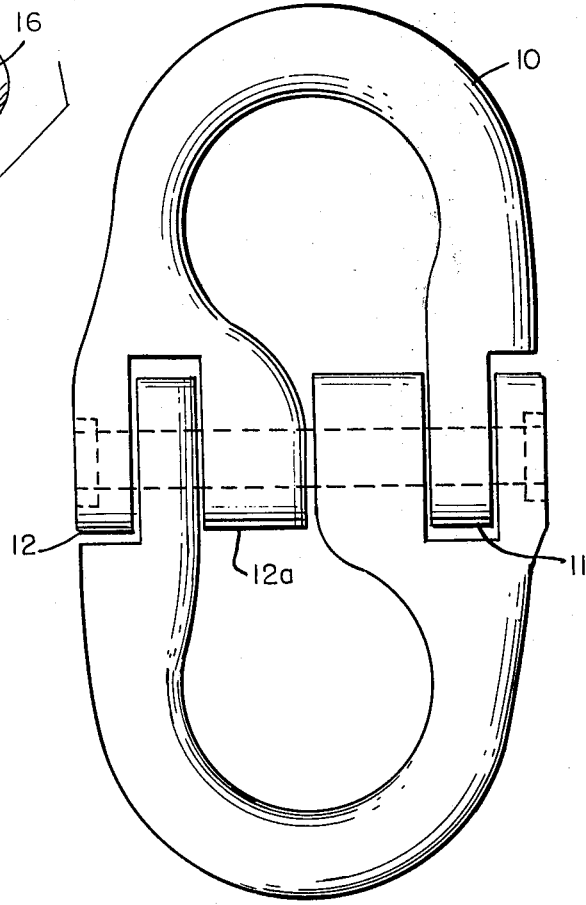
FIG. 4 shows the two identical half-links matedly assembled and with the connector pin inserted into the through bores in the legs of the half-links.

When the members 10 are assembled as shown in FIG. 4, pin 14 can be inserted through the aligned bores 9a, 9b, and 9c as shown. Pin 14 has an outer diameter which is slightly less than the inner diameter of the aligned bores 9 so that the pin can readily be inserted into the aligned bores.

Once the pin has been inserted in the aligned bores, it is retained in position by hammering onto each end of the pin a respective one of the split-ring collars 16, each such collar 16 being partially opened so as to effectively increase its diameter slightly as it is forced over the respectively chamfered end 17 of pin 14.

The disassembly of the connector device of the invention can readily be effected by driving one end of the pin out of the aligned bores, thereby forcing the split-ring collar at that end off the pin 14.

As previouly mentioned, a distinctive feature of the invention resides in the provision of the enlargement of the inner one of the two parallel legs so that when two such identical half-links are assembled, the outer borders of the two enlarged inner legs are brought into substantial contiguity. Thus, there is created a connector having the nature of stud link chain, wherein a central transverse member prevents knotting or twisting of the chain links. A further feature of the invention is the provision of the means comprising the pin 14 and the split-ring collars 16 to retain the pin in place.

What I claim is:

1. Connecting means for connecting chain, cable, and fittings comprising:

at least one connector member defining an arc of substantially 180° and terminating in opposed leg portions each having a through bore therein which bores are axially aligned, a connector pin passing through said aligned bores, said connector pin having a circumferential bevel on at least one end thereof, and a pin retaining means for said at least one end of said pin comprising a split-ring collar for driving onto said bevelled end of said pin, said collar normally having a diameter less than the diameter of said pin inwardly of its said bevelled end but greater than the diameter of the bevelled end portion of said pin so as to permit said collar to be driven onto the end of said pin and be frictionally held thereon said collar opens to accommodate the diameter of said pin.

2. The connecting means of claim 1 wherein each end of said connector pin is bevelled and a split ring collar is driven onto each end of said pin.

3. The connecting means of claim 1 which includes two said identical connector members each having at one end a single leg and at the other end a pair of spaced parallel legs and so configured that the single leg of one said connector member fits between the pair of legs of the other said connector member.

the single leg at one end of each connector member being set inwardly from the outer periphery of said member by an amount substantially equalling the thickness of the outermost leg of the pair of legs on the other end of said connector member to thereby provide an outer surface without protuberances on either side of the matedly assembled members.

4. The connecting means of claim 3 wherein the inner one of said pair of parallel legs is enlarged so that it extends substantially to the mid-point between the outermost borders of said connector member as measured along the length of said through bores.

5. Connecting means for connecting chain, cable, and fittings comprising:

a pair of identical connector members each defining an arc of substantially 180° and terminating in opposed leg portions, each said connector member having at one end a single leg and at the other end a pair of spaced parallel legs and so configured that the single leg of one said member fits between the pair of legs of the other said member, the inner one of said pair of parallel legs being enlarged so that it extends substantially to the mid-point between the outermost borders of said connector member as measured along the length of said through bores, the single leg at one end of each said connector member being set inwardly from the outer periphery of said member by an amount substantially equalling the thickness of the outermost leg of the pair of legs on the other end of said connector member to provide thereby an outer surface without protuberances on either side of the matedly assembled members, the three legs of each said connector member defining therein coaxial through bores, a connector pin passing through the coaxially aligned through bores of the assembled members and having a bevelled end on at least one of its ends, and means for retaining said pin in the aligned bores of said connector member and comprising a split ring collar whose normal diameter is less than that of said pin inwardly of its bevelled end but greater than of said bevelled end portion.

* * * * *